J. HOOVEN.
Machine for Skelping Iron.
No. 225,835. Patented Mar. 23, 1880.
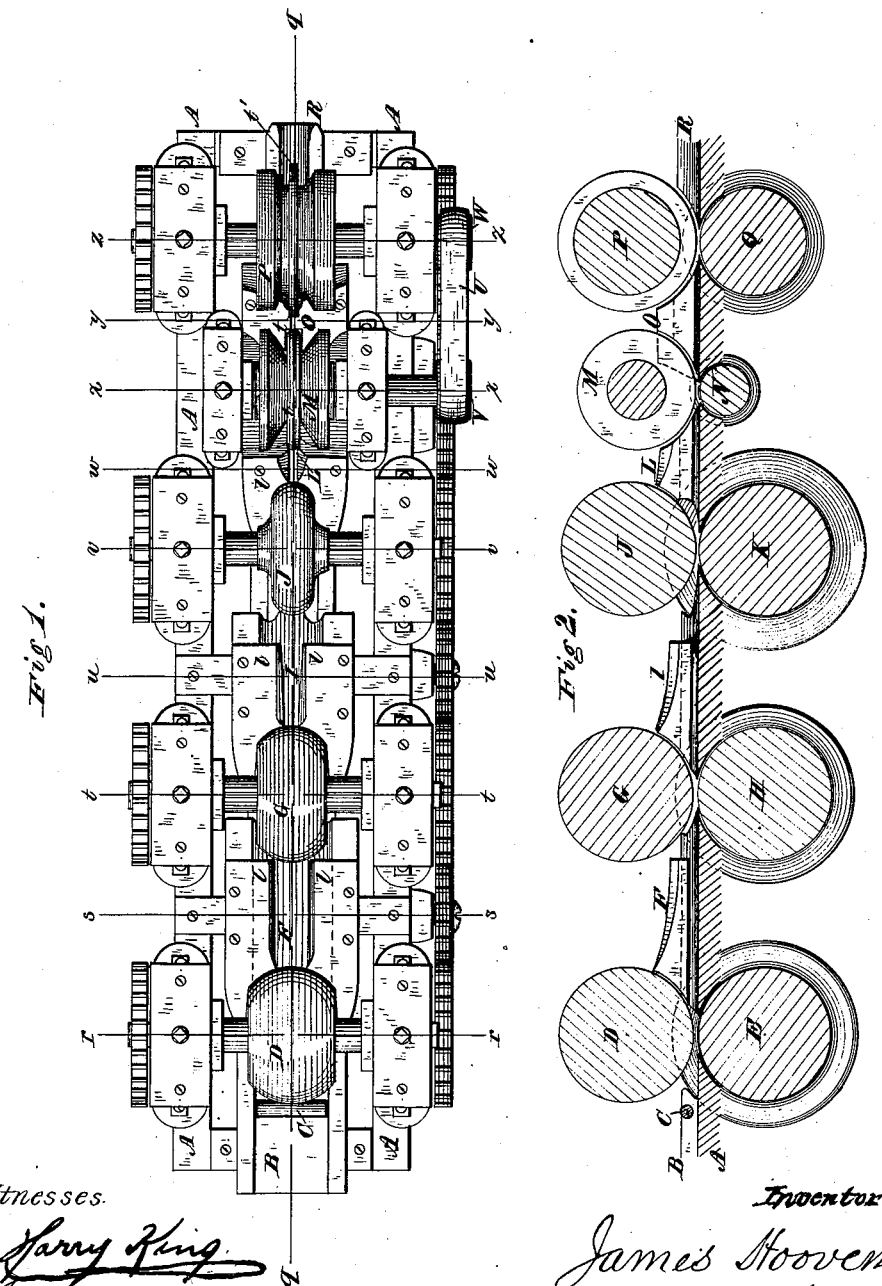
Witnesses.
Inventor.

J. HOOVEN.
Machine for Skelping Iron.
No. 225,835. Patented Mar. 23, 1880.
2 Sheets—Sheet 2.
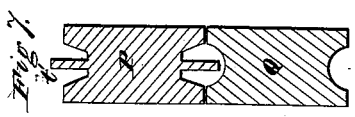
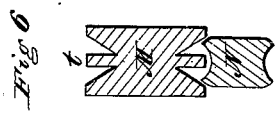
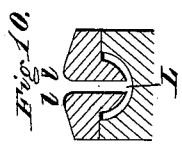
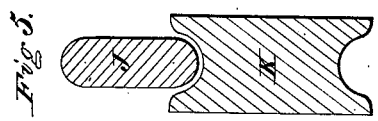
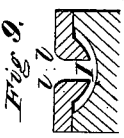
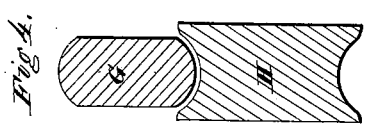
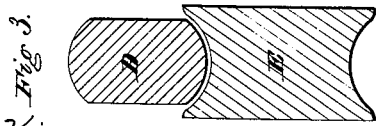
Witnesses.
Harry King.
Edward R Tyler
Inventor.
James Hooven
By his Attorneys,
Stansbury & Munn

UNITED STATES PATENT OFFICE.

JAMES HOOVEN, OF NORRISTOWN, PENNSYLVANIA.

MACHINE FOR SKELPING IRON.

SPECIFICATION forming part of Letters Patent No. 225,835, dated March 23, 1880.

Application filed October 29, 1879.

*To all whom it may concern:*

Be it known that I, JAMES HOOVEN, of Norristown, in the county of Montgomery and State of Pennsylvania, have invented certain new and useful Improvements in Machinery for Bending or Skelping Iron; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a top or plan view of the machine. Fig. 2 is a longitudinal vertical section on line *q q* of Fig. 1. Fig. 3 is a transverse vertical section on line *r r* of Fig. 1. Fig. 4 is a similar section on line *t t* of Fig. 1. Fig. 5 is a similar section on line *v v* of Fig. 1. Fig. 6 is a similar section on line *x x* of Fig. 1. Fig. 7 is a similar section on line *z z* of Fig. 1. Fig. 8 is a similar section on line *s s* of Fig. 1. Fig. 9 is a similar section on line *u u* of Fig. 1. Fig. 10 is a similar section on line *w w* of Fig. 1. Fig. 11 is a similar section on line *y y* of Fig. 1. Fig. 12 is an end view of the plate or strip flat. Fig. 13 is an end view of the plate after passing the last pair of rolls.

The same letter indicates the same part in all the figures.

The object of this invention is the bending or skelping of iron into proper shape for making or welding pipe or tubes either direct from the finishing-rolls of a rolling-mill, or after cutting into proper lengths after passing through said finishing-rolls without reheating, or after reheating in a skelping or bending furnace, as may be most expedient.

It may also be applied to the bending of iron or other metals into any shape required for any other purpose, either cold or in the other conditions mentioned.

The invention consists in the construction of a machine in which a continuous series of rolls or sheaves set upon a frame or bed-plate and provided with the necessary housings, guides, and fixtures, and having the proper surface configuration, bring the sheet or strip of metal gradually into the required shape or form as it passes through the skelping machine, all as hereinafter more particularly set forth.

In the accompanying drawings, A marks a heavy frame supporting the operative parts. B is the first guide, provided with the small roller C, under which the sheet or strip of metal S passes to the first pair of rolls, D E, the shape of which is shown in Fig. 3. From this pair the metal passes through guide F, (shown in Fig. 8,) its edges being held firmly, but so as to avoid friction, by the lips *l l* of said guide, and enters between the second pair of rolls, G H, (see Fig. 4,) which still further bend it, and deliver it to guide I, Fig. 9. Thence it passes successively between rolls J K, through guide L, Fig. 10, between rolls M N, through guide O, Fig. 11, and, finally, between rolls P Q, onto the delivery-guide R, having in its passage through the machine received the shape T. (Shown in Fig. 13.)

The successive open guides shown in Figs. 8, 9, 10, and 11 have curves gradually increasing in depth, and are provided with lips *l*, which receive and hold the edges of the sheet or strip of metal.

The guides, whose sides are parallel, in no manner serve to modify the form of the skelp while passing through them. They and their lips serve only to guide it by holding it firmly, yet without friction, to its proper line of direction. This peculiarity of this machine results in a great lessening of friction and saving of power. The inner edges of the lips are bent down and formed, as shown, to embrace the inner surfaces of the skelp at its edges loosely, but so as to effectually prevent its turning or twisting in the guide.

The forming-rollers M N, I have sometimes used as idlers; but I find they work better when driven, the small roller or sheave N operating to lessen friction. The upper roll, M, is provided with a tongue, *t*, which passes between the edges of the skelp. A similar tongue, *t'*, forms part of the upper roll, P, of the last pair, and serves to prevent the edges of the skelp from closing together.

The rolls M N and P Q serve by their action on the plate to bend its end inward and give a pear shape to the cross-section of the finished skelp, as shown in Fig. 13. This is an important feature, as, if the transverse section were circular the edges would fall under the welding-heat, and butt-welding would be rendered much more difficult.

The machine may be geared and driven in any convenient manner, the upper roller-journals being supported in adjustable boxes controlled by proper set-screws.

The band U connects the pulley V, on the end of the shaft of roller M, with pulley W, on the end of the shaft of roller P. When this band is removed roller M will run as an idler.

The strip or sheet of metal to be bent may, if desired, be fed to the machine direct from the finishing-rolls of the rolling-mill; but I prefer to cut the sheet into the proper lengths before bending. It may be bent hot or cold, as preferred.

I do not limit myself to any particular number of rolls or to their arrangement in a horizontal plane, as their number and position may be varied without any departure from the principle of my invention.

I disclaim, however, the use of horizontal and vertical rolls in combination in the same machine.

What I claim is—

1. In a machine for bending or skelping iron, the series of pairs of rolls D E, G H, J K, M N, and P Q, in combination with the open-lipped guides F I L O, all constructed and arranged substantially as described, and operating in the manner and for the purpose specified.

2. In a skelping-machine, a series of open-grooved guides provided with lips $l$, having their inner edges turned down, as described and shown, and arranged between the skelping-rollers for the purpose of guiding without compressing the skelp or modifying its form, all in the manner and for the purpose set forth.

In testimony that I claim the foregoing as my own invention I affix my signature in presence of two witnesses.

JAMES HOOVEN.

Witnesses:
ALBERT L. MURPHY,
W. C. STOKES.